(12) United States Patent
Nobe et al.

(10) Patent No.: US 9,647,547 B2
(45) Date of Patent: May 9, 2017

(54) VOLTAGE CONVERSION DEVICE FOR STEPPING UP VOLTAGE

(71) Applicant: TOYOTA JIDOSHA KABUSHIKI KAISHA, Toyota-shi, Aichi-ken (JP)

(72) Inventors: Daigo Nobe, Toyota (JP); Ryoji Sato, Toyohashi (JP); Kazuhito Hayashi, Inazawa (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 26 days.

(21) Appl. No.: 14/645,710

(22) Filed: Mar. 12, 2015

(65) Prior Publication Data

US 2015/0263624 A1 Sep. 17, 2015

(30) Foreign Application Priority Data

Mar. 14, 2014 (JP) ................................ 2014-051005

(51) Int. Cl.
*H02M 3/158* (2006.01)
*H02M 1/32* (2007.01)
*H02J 7/00* (2006.01)

(52) U.S. Cl.
CPC ............. *H02M 3/158* (2013.01); *H02M 1/32* (2013.01); *H02J 7/0065* (2013.01)

(58) Field of Classification Search
CPC .................. H02M 3/158; H02M 1/32; H02M 2001/0022; G05F 5/00; H02J 7/0065; B60L 3/0038; B60L 3/00
See application file for complete search history.

(56) References Cited

U.S. PATENT DOCUMENTS

| | | | |
|---|---|---|---|
| 2007/0120530 A1* | 5/2007 | Nozaki | B60L 3/0046 320/130 |
| 2007/0223259 A1* | 9/2007 | Nozaki | B60K 6/485 363/50 |
| 2009/0160248 A1* | 6/2009 | Ang | B60K 6/445 307/9.1 |
| 2010/0045103 A1* | 2/2010 | Mitsutani | B60L 3/12 307/9.1 |
| 2010/0070133 A1* | 3/2010 | Ishishita | B60L 11/1861 701/36 |

(Continued)

FOREIGN PATENT DOCUMENTS

| CN | 101896373 A | 11/2010 |
|---|---|---|
| JP | 2006-288163 A | 10/2006 |
| JP | 2011-223701 A | 11/2011 |

*Primary Examiner* — Gustavo Rosario Benitez
(74) *Attorney, Agent, or Firm* — Andrews Kurth Kenyon LLP (57) ABSTRACT

The present invention is intended to discriminate between a battery voltage sensor and the input voltage sensor of a converter for abnormality, without stopping the step-up operation of the converter. A voltage conversion device is provided with a battery, a converter, a battery voltage sensor, a voltage sensor for detecting the input voltage of the converter, a current sensor for detecting a reactor current, and a control unit. The control unit determines the abnormality of the battery voltage sensor or the input voltage sensor on the basis of an estimated value of input voltage calculated based on the reactor current, the input voltage of the converter and a battery voltage, without stopping the step-up operation of the converter.

2 Claims, 6 Drawing Sheets

(56) References Cited

U.S. PATENT DOCUMENTS

| | | | | |
|---|---|---|---|---|
| 2010/0244558 A1* | 9/2010 | Mitsutani | ............... | B60K 6/365 |
| | | | | 307/9.1 |
| 2010/0273072 A1* | 10/2010 | Hasegawa | ............. | B60L 3/0023 |
| | | | | 429/431 |
| 2012/0068646 A1* | 3/2012 | Takamatsu | .......... | B60L 11/1803 |
| | | | | 318/400.26 |
| 2014/0009090 A1* | 1/2014 | Ashida | .................... | H02P 31/00 |
| | | | | 318/139 |

\* cited by examiner

VOLTAGE CONVERSION DEVICE FOR STEPPING UP VOLTAGE

RELATED APPLICATION INFORMATION

This application claims priority to Japanese Patent Application No. 2014-051005, filed on Mar. 14, 2014, the entire content of which is incorporated herein by reference.

BACKGROUND OF THE INVENTION

Field of the Invention

The present invention relates to a voltage conversion device capable of stepping up a voltage supplied from a battery and supplying the voltage to a load.

Description of the Related Art

Conventionally, there has been known a load-driving device for stepping up a battery voltage using a step-up circuit to supply the voltage to a load (for example, a motor). Such a load-driving device is mounted on, for example, electricity-powered vehicles, such as hybrid automobiles and electric automobiles (including fuel-cell vehicles).

In this connection, Japanese Patent Laid-Open Publication No. 2006-288163 describes a technique of determining which voltage sensor is abnormal in a load-driving circuit including a battery, a step-up circuit, a battery voltage sensor for detecting a battery voltage, an input voltage sensor for detecting the input voltage of the step-up circuit, and an output voltage sensor for detecting the output voltage of the step-up circuit by comparing three voltage values detected by the sensors.

In the technique described in the abovementioned patent document, an abnormality determination is made on each sensor on the basis of the differences among the voltage values detected by the respective sensors, taking advantage of the idea that ideally, the three voltage values are equalized when having stopped step-up operation by the step-up circuit.

In the technique described in the abovementioned patent document, however, the step-up (or boosting) operation of the step-up circuit needs to be stopped when a determination is made to discriminate among the respective voltage sensors for abnormality. Accordingly, the technique is problematic in that a load being driven by the output voltage of the step-up circuit degrades in power performance due to the stoppage of step-up operation for the purpose of sensor abnormality determination.

It is an object of the present invention to provide a voltage conversion device capable of discriminating between the battery voltage sensor and the input voltage sensor of a step-up circuit for abnormality, without stopping the step-up operation of the step-up circuit.

SUMMARY OF THE INVENTION

A voltage conversion device according to the present invention is provided with a battery; a step-up circuit capable of stepping up a voltage input from the battery; a battery voltage sensor for detecting a battery voltage; an input voltage sensor for detecting the input voltage of the step-up circuit; an input current sensor for detecting the input current of the step-up circuit; and a control unit to which detected values are input from the respective sensors and which controls the step-up operation of the step-up circuit, wherein the control unit determines whether the battery voltage sensor or the input voltage sensor is abnormal on the basis of an estimated input voltage value calculated based on the input current of the step-up circuit, the input voltage of the step-up circuit and the battery voltage, without stopping the step-up operation of the step-up circuit.

In the voltage conversion device according to the present invention, a comparison is preferably made between the differences in absolute value of the detected value of the input voltage sensor and the detected value of the battery voltage sensor from the estimated input voltage value, to determine a voltage sensor having the larger difference to be abnormal.

In addition, in the voltage conversion device according to the present invention, instead of one of the battery voltage sensor or the input voltage sensor that is determined to be abnormal, control of the step-up operation of the step-up circuit is preferably continued using the detected value of the other voltage sensor.

According to the voltage conversion device according to the present invention, the step-up operation of the step-up circuit is not stopped when an abnormality determination is made on the battery voltage sensor and the input voltage sensor of the step-up circuit, and therefore, electrical power supplied to a load does not fall short. Accordingly, discrimination can be made between the battery voltage sensor and the input voltage sensor for abnormality, without affecting the power performance of the load.

BRIEF DESCRIPTION OF THE DRAWINGS

FIG. 2 is a schematic view illustrating a current flow when the upper arm of a converter is on;

FIG. 3 is a schematic view illustrating a current flow when the lower arm of the converter is on;

DETAILED DESCRIPTION OF THE PREFERRED EMBODIMENTS

Hereinafter, embodiments according to the present invention will be described in detail with reference to the accompanying drawings. In the description, specific shapes, materials, numerical values, directions and the like are merely examples for easy understanding of the present invention and may be modified as appropriate, according to application, purpose of use, specification, or the like. In addition, in cases where the following description encompasses a plurality of embodiments or modified examples, use of characterizing portions of those embodiments or examples in appropriate combination has been assumed from the beginning.

Figure 1:
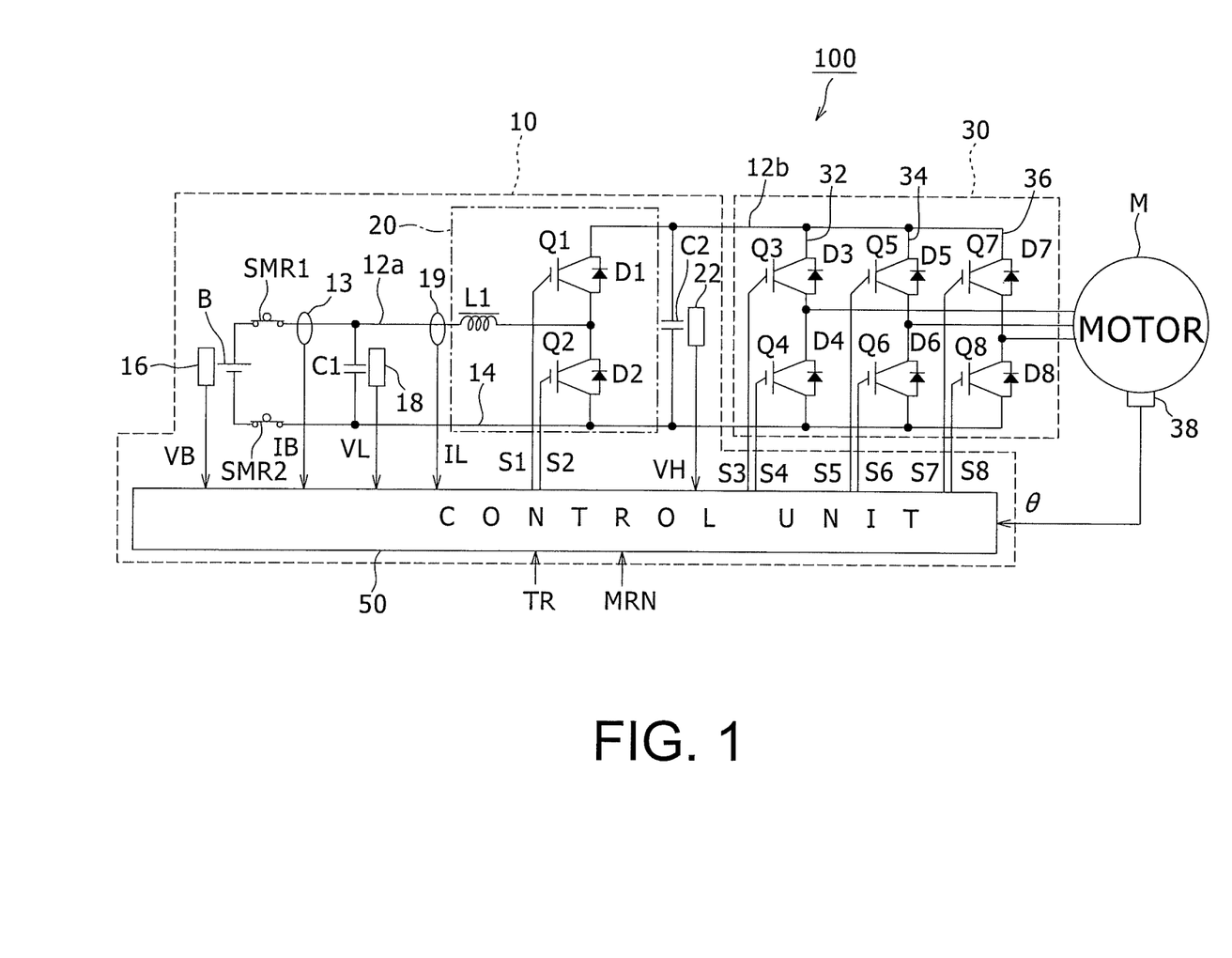
FIG. 1 is a schematic view illustrating an overall schematic configuration of a motor drive unit including a voltage conversion device which is one embodiment of the present invention.

FIG. 1 is a circuit diagram of a motor drive unit 100 to which a voltage conversion device 10 which is one embodiment of the present invention is applied. As illustrated in FIG. 1, the motor drive unit 100 is provided with a battery B which is a DC power supply; a converter (step-up circuit) 20; an inverter 30; positive-polarity lines 12a and 12b; a negative-polarity line 14; current sensors 13 and 19; voltage sensors 16, 18 and 22; a filtering capacitor C1; a smoothing capacitor C2; and a control unit 50. The voltage conversion device 10 of the present embodiment is configured to include the battery B which is a DC power supply, the positive-polarity line 12a, the negative-polarity line 14, the current sensors 13 and 19, the voltage sensors 16 and 18, the converter 20, the filtering capacitor C1, and the control unit 50, among these components.

The motor drive unit 100 is mounted on electricity-powered vehicles, such as hybrid automobiles and electric vehicles (including fuel-cell automobiles). A motor M is mechanically coupled with non-illustrated drive wheels to generate torque for driving a vehicle. Alternatively, the motor M may be assembled into a hybrid automobile such that the motor M is mechanically coupled with a non-illustrated engine to operate as an electrical generator for generating electricity using the motive power of the engine and as an electric motor for starting the engine.

The battery B is a rechargeable electric accumulator, for example, a secondary battery such as a nickel-hydrogen battery or a lithium-ion battery. Note that a high-capacity capacitor may be used as the battery B in place of the secondary battery.

The positive-polarity line 12a is connected to the positive-polarity terminal of the battery B, and the negative-polarity line 14 is connected to the negative-polarity terminal of the battery B. In addition, a system main relay SMR1 is disposed on the positive-polarity line 12a, and a system main relay SMR2 is disposed on the negative-polarity line 14. The respective relays SMR1 and SMR2 are on/off-controlled in response to signals from the control unit 50.

The voltage sensor 16 detects the interterminal voltage of the battery B. The battery voltage VB detected by the voltage sensor 16 is output to the control unit 50. Hereafter, the voltage sensor 16 is referred to as the VB sensor where appropriate.

The current sensor 13 is disposed on the positive-polarity line 12a connected to the positive-polarity terminal of the battery B. The current sensor 13 detects currents input to and output from the battery B. A battery current IB detected by the current sensor 13 is output to the control unit 50. Hereafter, the current sensor 13 is referred to as the IB sensor where appropriate.

The converter 20 includes a reactor L1, switching elements Q1 and Q2, and diodes D1 and D2. One end of the reactor L1 is connected to the positive-polarity line 12a connected to the positive-polarity terminal of the battery B, and the other end is connected to an intermediate point between the switching element Q1 and the switching element Q2. The switching elements Q1 and Q2 are connected in series between the positive-polarity line 12b and the negative-polarity line 14. The collector of the switching element Q1 is connected to the positive-polarity line 12b, and the emitter of the switching element Q2 is connected to the negative-polarity line 14. In addition, each of the diodes D1 and D2 for passing a current from the emitter side to the collector side is connected between the collector and emitter of each of the switching elements Q1 and Q2, respectively.

The converter 20 raises the voltage between the positive-polarity line 12b and the negative-polarity line 14 to a voltage higher than the battery voltage VB on the basis of a signal from the control unit 50. Signals of the converter 20 include a gate signal S1 used to control the on-duty cycle of the switching element Q1, and a gate signal S2 used to control the on-duty cycle of the switching element Q2. The gate signals S1 and S2 are associated with each other so that the switching elements Q1 and Q2 are opposite in state to each other (i.e., the Q2 is off when the Q1 is on, and the Q2 is on when the Q1 is off) when the step-up operation is executed.

A current sensor (input current sensor) 19 detects a reactor current IL input to the reactor L1 of the converter 20 and outputs the detected value to the control unit 50. The current sensor 19 detects a current flowing from the battery B to the reactor L1 as a positive value and a current flowing from the reactor L1 to the battery B as a negative value. Hereafter, the current sensor 19 is referred to as the IL sensor where appropriate.

The filtering capacitor C1 is connected between the positive-polarity line 12a and the negative-polarity line 14. The voltage sensor 18 detects a voltage VL across the filtering capacitor C1 as an input voltage of the converter 20 and outputs the detected value to the control unit 50. Hereafter, the voltage sensor 18 is referred to as the VL sensor where appropriate.

The smoothing capacitor C2 is connected between the positive-polarity line 12b and the negative-polarity line 14. The smoothing capacitor C2 smoothens a DC voltage received from the converter 20 and supplies the smoothed DC voltage to the inverter 30. The voltage sensor 22 detects a voltage VH across the smoothing capacitor C2 as an output voltage of the converter 20 and outputs the detected value to the control unit 50. Hereafter, the voltage sensor 22 is referred to as the VH sensor where appropriate.

The inverter 30 includes a U-phase arm 32, a V-phase arm 34 and a W-phase arm 36. The U-phase arm 32, the V-phase arm 34 and the W-phase arm 36 are connected in parallel between the positive-polarity line 12b and the negative-polarity line 14. The U-phase arm 32 includes switching elements Q3 and Q4 connected in series. The V-phase arm 34 includes switching elements Q5 and Q6 connected in series. The W-phase arm 36 includes switching elements Q7 and Q8 connected in series. In addition, each of the diodes D3 to D8 for passing a current from the emitter side to the collector side is connected between the collector and emitter of each of the switching elements Q3 to Q8, respectively. Intermediate points among the arms of the respective phases are connected to coils of the respective phases of the motor M.

On the basis of signals S3 to S8 from the control unit 50, the inverter 30 converts direct-current (DC) power supplied from the positive-polarity line 12b and the negative-polarity line 14 to three-phase alternating currents, and outputs the alternating currents to the motor M to drive the motor M. Consequently, the motor M is driven so as to generate torque designated by a torque command value TR. In addition, the inverter 30 converts three-phase alternating-current power generated by the motor M to direct currents on the basis of a signal from the control unit 50 when an electricity-powered vehicle equipped with the motor drive unit 100 is braked, and outputs the direct currents to the positive-polarity line 12b and the negative-polarity line 14 on the converter 20 side.

The control unit 50 is composed of an non-illustrated electronic control unit (ECU: Electronic Control Unit) containing a CPU (Central Processing Unit) and a memory. The control unit 50 is configured to execute predetermined arithmetic processing on the basis of a map and a program stored in the memory. Alternatively, the control unit 50 may be configured so that at least part of the ECU executes predetermined numerical/logical arithmetic processing by means of hardware, such as an electronic circuit.

Using a pulse-width modulation method, the control unit 50 generates PWM signals for driving the converter 20 and outputs the generated PWM signals to the converter 20 as signals S1 and S2.

In addition, the control unit 50 generates PWM signals for driving the motor M on the basis of the torque command value TR and the number of revolutions MRN of the motor M received from the non-illustrated external ECU, and outputs the generated PWM signals to the inverter 30 as signals S3 to S8.

Figure 2:
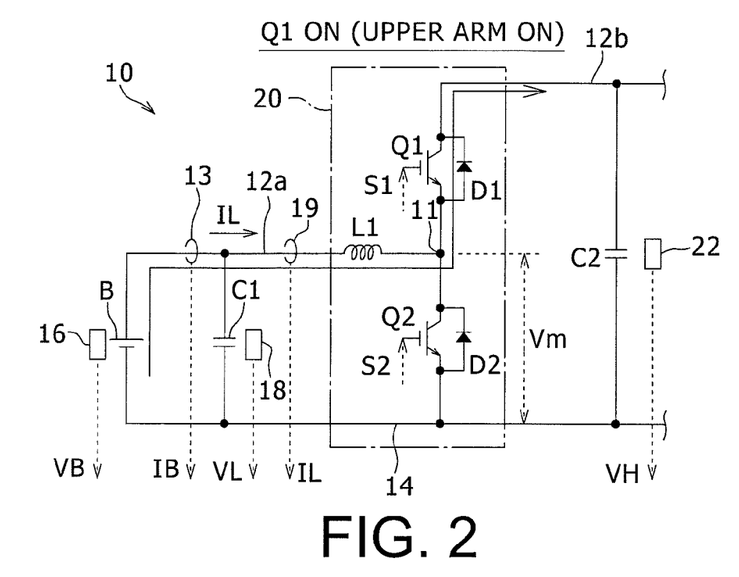

FIG. 2 illustrates the flow of a (positive) current IL when the switching element Q1 of the converter 20 is in an on-state, i.e., when the upper arm is on. In this case, the current IL flows through the diode D1, as illustrated in FIG. 2. Assuming that the voltage between the connection point of the switching elements Q1 and Q2 and the negative-polarity line 14 is Vm, the inductance value of the reactor L1 is L, and the gradient of the current IL (rate of change per unit time) is dIL/dt, then a voltage equation under this condition results in Equation (1) shown below:

$$VL - L(dIL/dt) - Vm = 0 \quad (1)$$

Assuming that a voltage across the smoothing capacitor C2 is VH, then voltage Vm=VH while the current IL is flowing through the diode D1. Assigning this voltage value to Equation (1) and transforming the equation results in Equation (2) shown below. Further transforming Equation (2) results in Equation (3).

$$VL - L(dIL/dt) - VH = 0 \quad (2)$$

$$dIL/dt = (VL - VH)/L \quad (3)$$

From this Equation (3), it is understood that if the current IL is positive, the gradient dIL/dt of the current IL is (VL−VH)/L when the switching element Q1 is on. Since VL<VH under normal conditions, the gradient dIL/dt of the current IL is negative.

Figure 3:
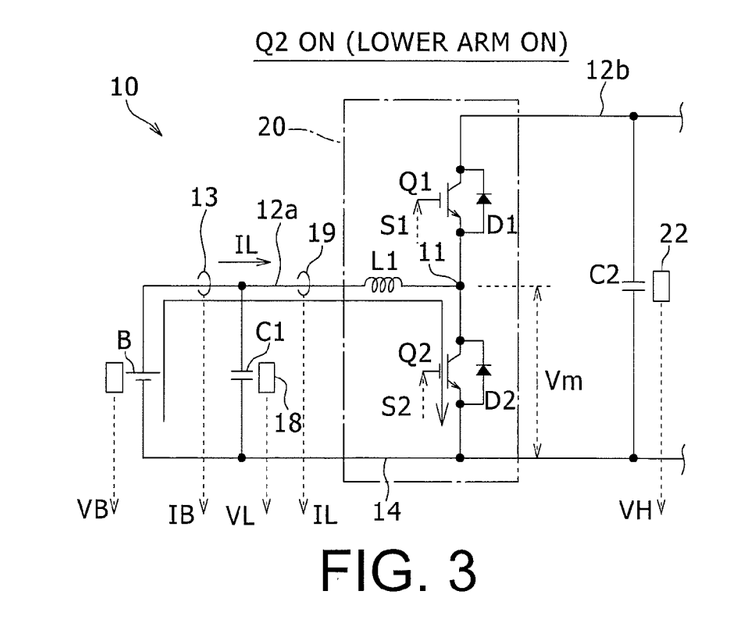

FIG. 3 illustrates the flow of the (positive) current IL when the switching element Q2 of the converter 20 is in an on-state, i.e., when the lower arm is on. In this case, the current IL flows through the switching element Q2, as illustrated in FIG. 3. The voltage equation under this condition results in Equation (4) shown below:

$$VL - L(dIL/dt) - Vm = 0 \quad (4)$$

Although Equation (4) itself is the same as Equation (1), the voltage Vm equals 0 rather than VH while the current IL is flowing through the switching element Q2. Assigning this voltage value to Equation (4) and transforming the equation results in Equation (5) shown below. Further transforming Equation (5) results in Equation (6).

$$VL - L(dIL/dt) - 0 = 0 \quad (5)$$

$$dIL/dt = VL/L \quad (6)$$

From this Equation (6), it is understood that if the current IL is positive, the gradient dIL/dt of the current IL is VL/L when the switching element Q2 is on. Since VL>0 under normal conditions, the gradient dIL/dt of the current IL is positive.

As described above, the current IL when the switching element Q1 is on decreases with the gradient (VL−VH)/L if the current IL is positive, whereas the current IL when the switching element Q2 is on increases with the gradient dIL/dt of VL/L.

Figure 4:
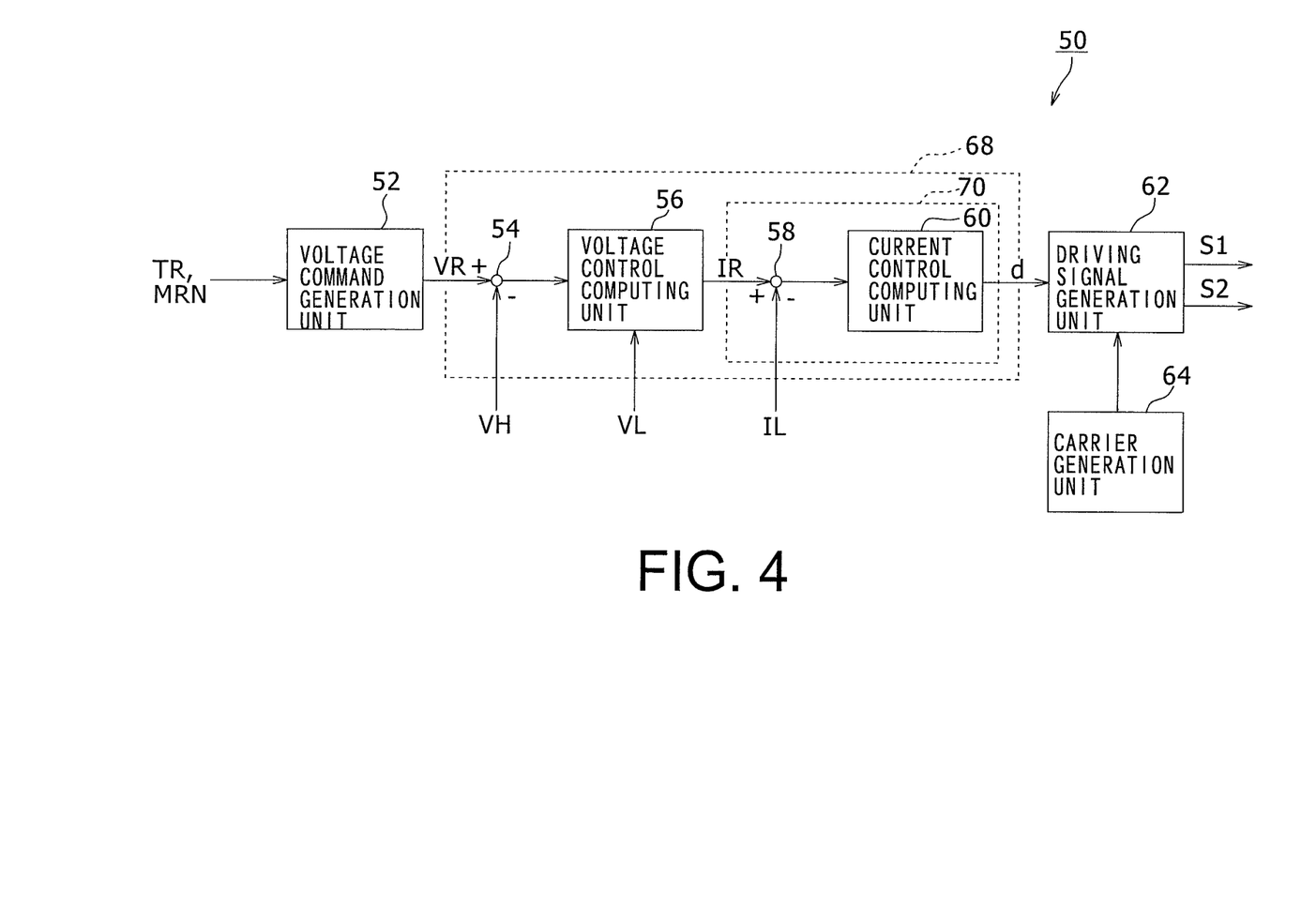
FIG. 4 is the functional block diagram of a section of a control unit related to converter control.

Next, the control of step-up operation in the converter 20 will be described with reference to FIG. 4. FIG. 4 is the functional block diagram of a section of the control unit 50 related to the control of the converter 20. As illustrated in FIG. 4, the control unit 50 includes a voltage command generation unit 52, subtraction units 54 and 58, a voltage control computing unit 56, a current control computing unit 60, a driving signal generation unit 62, and a carrier generation unit 64.

The voltage command generation unit 52 generates a voltage command value VR representing the target value of the voltage VH which is the output voltage of the converter 20. For example, the voltage command generation unit 52 generates the voltage command value VR on the basis of the power of the motor M calculated from the torque command value TR and the number of revolutions MRN of the motor M.

The subtraction unit 54 subtracts the detected value of the voltage VH input from the VH sensor 22 from the voltage command value VR, and outputs the result of calculation to the voltage control computing unit 56.

Using the detected value of the voltage VL and a value obtained by subtracting the detected value of the voltage VH from the voltage command value VR, the voltage control computing unit 56 performs a control computation (for example, proportional-integral control) for matching voltage VH with the voltage command value VR. Then, the voltage control computing unit 56 outputs the calculated amount of control as a current command value IR.

The subtraction unit 58 subtracts the detected value of the current IL from the current command value IR output from the voltage control computing unit 56, and outputs the result of computation to the current control computing unit 60.

The current control computing unit 60 receives a value obtained by subtracting the value of the current IL detected by the IL sensor 19 from the current command value IR from the subtraction unit 58, and performs a control computation (for example, proportional-integral control) for matching the current IL with the current command value IR. Then, the current control computing unit 60 outputs the calculated amount of control to the driving signal generation unit 62 as a duty command value d. Here, the duty command value d can be represented as duty command value d=VL/VH.

The carrier generation unit 64 generates a carrier signal CR composed of a triangular wave for generating the PWM signals S1 and S2 in a driving signal generation unit 62 to be described later, and outputs the generated carrier signal to the driving signal generation unit 62.

The driving signal generation unit 62 compares the duty command value d received from the current control computing unit 60 with the carrier signal CR received from the carrier generation unit 64 to determine which is larger, and generates the gate signals S1 and S2 according to the result of comparison. For example, the driving signal generation unit 62 turns on the gate signal S1 (and turns off the gate signal S2) if the carrier signal CR is smaller than the duty command value d, and otherwise, turns on the gate signal S2 (and turns off the gate signal S1).

In this control unit 50, a control computation for matching the voltage VH with the voltage command value VR is performed by the voltage control computing unit 56 (voltage control). In addition, a control computation for matching the current IL with the current command value IR is performed by the current control computing unit 60 with the control output of the voltage control computing unit 56 as the current command value IR of the current IL (current control). Therefore, a variation in the voltage VH due to a dead time or the like set during the on-state time of each of the switching elements Q1 and Q2 can be prevented as the result of feedback control being performed with respect to the voltage VH and the current IL.

Note that the subtraction unit 54, the voltage control computing unit 56, the subtraction unit 58 and the current control computing unit 60 form a main loop 68 for matching the voltage VH with the voltage command value VR, and the subtraction unit 58 and the current control computing unit 60 form a minor loop 70 for matching the current IL with the current command value IR.

Voltage and current values need to be precisely detected with various sensors, in order for the motor drive unit 100 including such a voltage conversion device 10 as described above to operate normally. To that end, the control unit 50 needs to monitor various sensors for abnormality, and take appropriate measures to cause a transition to fail-safe mode if any abnormality is detected.

Here, if any abnormality occurs in the VL sensor 18 included in the voltage conversion device 10, the voltage conversion device 10 can no longer perform the above-described voltage step-up control of the converter 20. In addition, if any abnormality occurs in the VB sensor 16 included in the voltage conversion device 10, the voltage conversion device 10 can no longer monitor the status of the battery B. In the voltage conversion device 10 of the present embodiment, two detected values agree with each other as long as the VL sensor 18 and the VB sensor 16 function normally. Accordingly, if the difference between the two detected values exceeds a preset threshold even though errors and momentary variations are taken into consideration, one of the sensors can be determined as being abnormal. If the step-up operation of the converter 20 is stopped in order to discriminate between the sensors for abnormality, however, a decrease in the output voltage VH of the converter 20 degrades the power performance of the motor M.

Hence, in the voltage conversion device 10 of the present embodiment, the below-described process is carried out in the control unit 50 to discriminate between the VB sensor 16 and the VL sensor 18 for abnormality.

Figure 5:
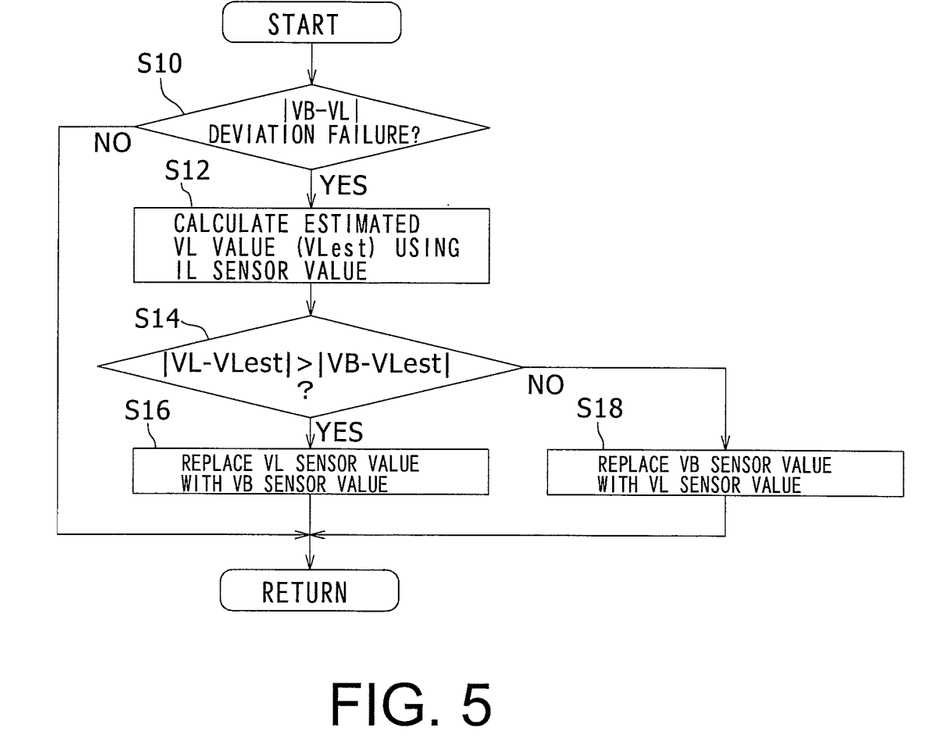
FIG. 5 is a flowchart illustrating a processing procedure of the control unit.

FIG. 5 is a flowchart illustrating a processing procedure performed in the control unit 50. As illustrated in FIG. 5, the control unit 50 determines, in step S10, whether the absolute value of the deviation between the battery voltage VB and the input voltage VL of the converter 20 exceeds a predetermined threshold. If the deviation exceeds the threshold, the control unit 50 moves to the next step S12, and otherwise, terminates the process.

Next, the control unit 50 calculates an estimated value (VLest) of the converter input voltage VL using the reactor current IL detected by the IL sensor 19. The rate of change $\Delta IL$ of the reactor current IL is used in this calculation. This rate of change $\Delta IL$ can be calculated by sampling the reactor current IL at two or more points when the switching element Q2 is on, as illustrated in FIG. 3. Alternatively, a differentiation circuit may be added to the IL sensor 19 to use the output of the differentiation circuit as $\Delta IL$. The estimated value of VL can be calculated by assigning the rate of change $\Delta IL$ obtained in this way to Equation (5) shown above. That is, the estimated value of VL is calculated using Equation (7) shown below:

$$VLest = L \times \Delta IL \quad (7)$$

Note that the inductance value L of the reactor L1 may be a value previously stored as a known fixed value and read out, or may be calculated by using the reactor current IL as a parameter.

Subsequently, in step S14, the control unit 50 compares the absolute value of the difference between the voltage VL, which is the detected value of the VL sensor 18, and the estimated value of VL with the absolute value of the difference between the voltage VB, which is the detected value of the VB sensor 16, and the estimated value of VL, to determine which is larger.

If the difference of the voltage VL is determined to be larger, the VL sensor 18 is identified as being abnormal. Thus, the value of VL detected by the VL sensor 18 is replaced with the value of VB detected by the VB sensor 16 in the subsequent step S16, and a series of processes is terminated. In this case, the voltage VB detected by the VB sensor 16 is used as VL in the voltage step-up control of the converter 20.

On the other hand, if the difference of the voltage VB is determined to be larger in the step S14, the VB sensor 16 is identified as being abnormal. Thus, the value of VB detected by the VB sensor 16 is replaced with the value of VL detected by the VL sensor 18 in the subsequent step S18, and a series of processes is terminated. In this case, the voltage VL detected by the VL sensor 18 is used to monitor the status of the battery.

As described above, according to the voltage conversion device 10 of the present embodiment, an abnormality determination on the battery voltage sensor 16 and the input voltage sensor 18 of the converter 20 can be performed without stopping the step-up operation of the converter 20. Electrical power supplied to the motor M therefore does not fall short. Consequently, discrimination can be made between the battery voltage sensor 16 and the input voltage sensor 18 for abnormality, without affecting the power performance of the motor M.

In addition, control can be continued by using the detected value of the other one of the voltage sensors 16 and 18 in place of the detected value of that one of the voltage sensors 16 and 18 in which sensor failure is detected in subsequent control (including monitoring).

Figure 6:
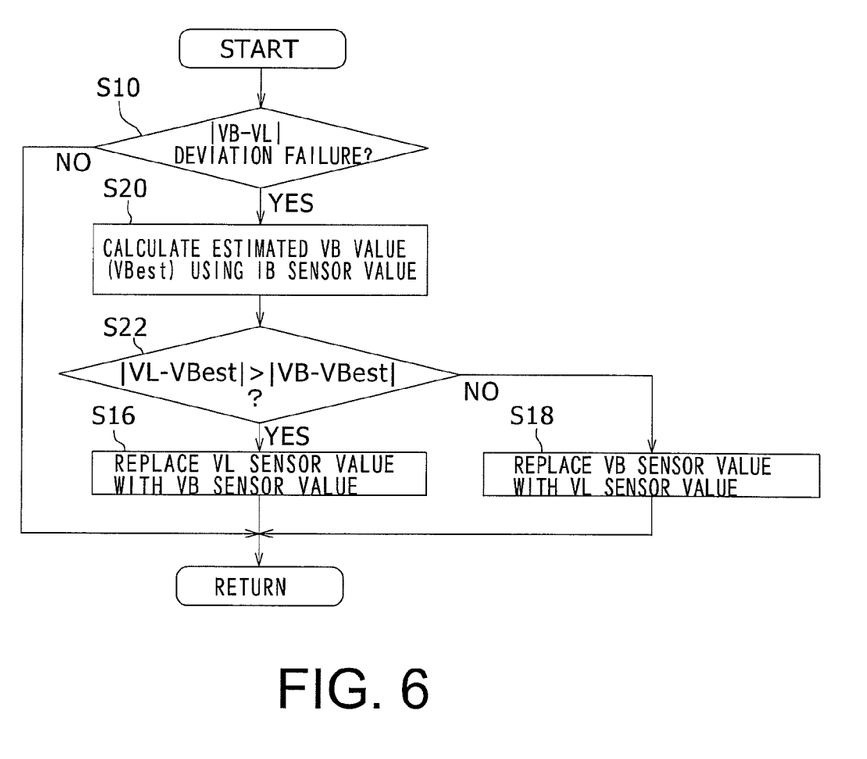
FIG. 6 is a flowchart illustrating another processing procedure of the control unit.

Next, another processing procedure in the control unit 50 will be described with reference to FIG. 6. In FIG. 6, the same processes as those of FIG. 5 are denoted by like step numbers and will not be described again. Referring to FIG. 6, this processing procedure differs from the above-described processing procedure of FIG. 5 in steps S20 and S22.

As illustrated in FIG. 6, if either one of the VB sensor 16 and the VL sensor 18 is determined to be abnormal in step S10, the control unit 50 calculates the estimated value (VBest) of the battery voltage VB using a current IB which is the detected value of the IS sensor 13 (see FIG. 1) in the subsequent step S20. Specifically, the estimated value of the battery voltage VB can be derived on the basis of battery temperature, the SOC (State of Charge) value of the battery B, and the internal resistance RB of the battery B.

More particularly, battery temperature TB is detected by a non-illustrated temperature sensor and input to the control unit 50. In addition, the SOC value is evaluated by integrating the detected value of the IB sensor 13. Still further, a value derived from a map or the like previously stored in the memory using the battery temperature TB and the like as parameters can be used as the internal resistance RB of the battery B.

Figure 7:
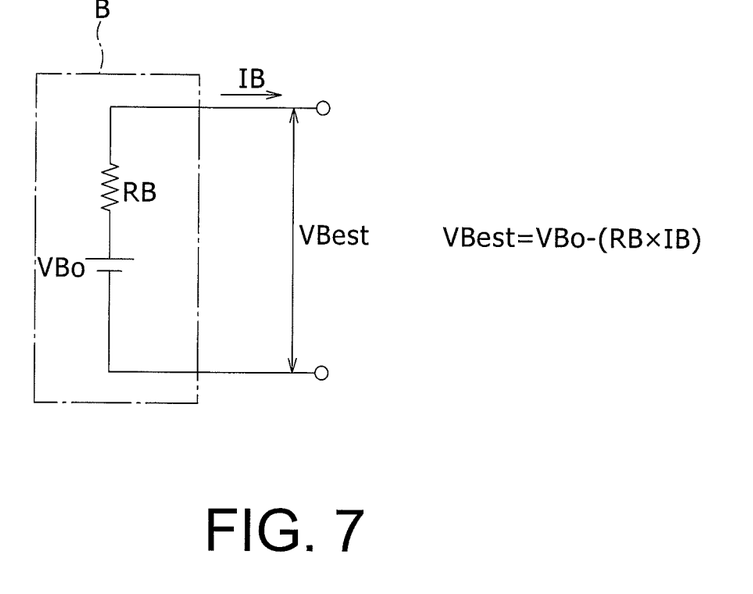
FIG. 7 is a schematic view used to describe the way of calculating an estimated battery voltage value in FIG. 6.

As illustrated in FIG. 7, the estimated value of the battery voltage VB can be calculated by subtracting a voltage drop due to the internal resistance RB from an ideal battery voltage $VB_0$ read out from the memory using the SOC value as a parameter. That is, the estimated value of VB is calculated by Equation (8) shown below:

$$VBest = VB_0 - (RB \times IB) \quad (8)$$

Subsequently, the control unit 50 compares the absolute value of the difference between the voltage VL, which is the detected value of the VL sensor 18, and the estimated value of VB with the absolute value of the difference between the voltage VB, which is the detected value of the VB sensor 16, and the estimated value of VB in step S22, to determine which is larger.

If the difference of the voltage VL is determined to be larger, the VL sensor 18 is identified as being abnormal, whereas if the difference of the voltage VB is determined to be larger, the VB sensor 16 is identified as being abnormal. Subsequent processes (steps S16 and S18) are the same as those of FIG. 5.

As described above, even when an abnormality determination on the VB sensor 16 and the VL sensor 18 is performed using the estimated value of VB, the determination can be made without stopping the step-up operation of the converter 20. Electrical power supplied to the motor M therefore does not fall short. Consequently, discrimination can be made between the battery voltage sensor 16 and the input voltage sensor 18 for abnormality, without affecting the power performance of the motor M.

In addition, subsequent control (including monitoring) can be continued by using the detected value of the other one of the voltage sensors 16 and 18 in place of the detected value of that one of the voltage sensors 16 and 18 in which sensor failure is detected.

It should be noted that the present invention is not limited to the above-described embodiments and the modified examples thereof, but may be altered and modified in various ways.

For example, a description has been given above of an example in which the estimated value of VL is calculated by Equation (7) using the rate of change ΔIL of the reactor current IL. Without limitation to this method, however, the estimated value of VL may be calculated on the basis of the rate of change ΔIB of the battery current IB.

DESCRIPTION OF SYMBOLS

10: voltage conversion device, 12a, 12b: positive-polarity line, 13, 19: current sensor, 14: negative-polarity line, 16: battery voltage sensor, 18: input voltage sensor, 20: converter (step-up circuit), 22: voltage sensor, 30: inverter, 32: U-phase arm, 34: V-phase arm, 36: W-phase arm, 50: control unit, 52: voltage command generation unit, 54, 58: subtraction unit, 56: voltage control computing unit, 60: current control computing unit, 62: driving signal generation unit, 64: carrier generation unit, 68: main loop, 70: minor loop, 100: motor drive unit, B: battery, C1: filtering capacitor, C2: smoothing capacitor, CR: carrier signal, d: duty command value, D1 to D8: diode, IB: battery current, IL: reactor current, IR: current command value, L: inductance value, L1: reactor, M: motor, MRN: number of revolutions of motor, Q1 to Q8: switching element, RB: internal resistance (of battery), S1, S2: gate signal, S3 to S8: signal, SMR1, SMR2: system main relay, TB: battery temperature, TR: torque command value, VB: battery voltage, $VB_0$: ideal battery voltage, VH: output voltage (of converter), VL: input voltage (of converter), Vm: voltage, VR: voltage command value, and ΔIB, ΔIL: rate of change.

What is claimed is:

1. A voltage conversion device comprising:
   a battery;
   a step-up circuit capable of stepping up a voltage input from the battery;
   a battery voltage sensor for detecting a battery voltage;
   an input voltage sensor for detecting the input voltage of the step-up circuit;
   an input current sensor for detecting the input current of the step-up circuit; and
   a control unit to which detected values are input from the respective sensors and which controls the step-up operation of the step-up circuit, wherein the control unit determines whether one of the battery voltage sensor and the input voltage sensor is abnormal on the basis of an estimated input voltage value calculated based on the input current of the step-up circuit, the input voltage of the step-up circuit and the battery voltage, without stopping the step-up operation of the step-up circuit; and wherein instead of controlling the step-up operation of the step-up circuit with one of the battery voltage sensor and the input voltage sensor that is determined to be abnormal, control of the step-up operation of the step-up circuit is continued using the detected value of the battery voltage.

2. The voltage conversion device according to claim 1, wherein a comparison is made between differences in absolute value of the detected value of the input voltage sensor and the detected value of the battery voltage sensor from the estimated input voltage value ,to determine a voltage sensor having the larger difference to be abnormal.

* * * * *